United States Patent
Delco

(10) Patent No.: US 9,880,867 B2
(45) Date of Patent: Jan. 30, 2018

(54) METHOD AND SUBSYSTEM FOR DATA EXCHANGE BETWEEN A GUEST OPERATING SYSTEM AND A VIRTUALIZATION LAYER

(71) Applicant: VMware, Inc., Palo Alto, CA (US)

(72) Inventor: Matthew Ray Delco, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 826 days.

(21) Appl. No.: 14/099,867

(22) Filed: Dec. 6, 2013

(65) Prior Publication Data
US 2015/0160960 A1    Jun. 11, 2015

(51) Int. Cl.
*G06F 9/46* (2006.01)
*G06F 9/455* (2006.01)
*G06F 9/44* (2006.01)

(52) U.S. Cl.
CPC ...... *G06F 9/45545* (2013.01); *G06F 9/45533* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 2006/0184349 A1* | 8/2006 | Goud | G06F 9/45537 703/24 |
| 2007/0169088 A1* | 7/2007 | Lambert | G06F 11/0709 717/168 |
| 2008/0263009 A1* | 10/2008 | Buettner | G06F 17/30979 |
| 2009/0125901 A1* | 5/2009 | Swanson | G06F 9/45558 718/1 |
| 2009/0249319 A1* | 10/2009 | Bai | G06F 11/2294 717/168 |
| 2011/0161482 A1* | 6/2011 | Bonola | G06F 9/5077 709/223 |
| 2012/0151475 A1* | 6/2012 | Bealkowski | G06F 9/455 718/1 |
| 2013/0263209 A1* | 10/2013 | Panuganty | H04L 43/04 726/1 |
| 2013/0289926 A1* | 10/2013 | Maity | G06F 9/5077 702/130 |

* cited by examiner

*Primary Examiner* — Bradley Teets

(57) ABSTRACT

The current document is directed to methods and subsystems for communication between virtualization layers and guest operating systems. A hardware baseboard management controller ("BMC") provides an out-of-band communications link and management interface to a computer system that can be accessed by a system administrator through a remote console. A virtualization layer may provide a virtualized BMC ("vBMC") that provides a data-and-command-exchange medium between a guest operating system and the virtualization layer. The virtualization layer may transmit commands, query status and configuration information, and transfer data through this data-and-command-exchange medium to the guest operating system.

20 Claims, 18 Drawing Sheets

| Field | Byte Length | Byte Offset | Description |
|---|---|---|---|
| Header | | | |
| Signature | 4 | 0 | 'SPCR'. Signature for the Serial Port Console Redirection Table. |
| Length | 4 | 4 | Length, in bytes, of the entire Serial Port Console Redirection Table |
| Revision | 1 | 8 | 1 |
| Checksum | 1 | 9 | Entire table must sum to zero. |
| OEMID | 6 | 10 | OEM ID. |
| OEM Table ID | 8 | 16 | For the Serial Port Console Redirection Table, the table ID is the manufacturer model ID. |
| OEM Revision | 4 | 24 | OEM revision of Serial Port Console Redirection Table for supplied OEM Table ID |
| Creator ID | 4 | 28 | Vendor ID of utility that created the table. For the DSDT, RSDT, SSDT, and PSDT tables, this is the ID for the ASL Compiler. |
| Creator Revision | 4 | 32 | Revision of utility that created the table. For the DSDT, RSDT, SSDT, and PSDT tables, this is the revision for the ASL Compiler. |
| Interface Type | 1 | 36 | Indicates the type of the register interface:<br>0 = full 16550 interface<br>1 = full 16450 interface (must also accept writing to the 16550 FCR register)<br>2-255 = reserved |
| Reserved | 3 | 37 | Must be 0. |
| Base Address | 12 | 40 | The base address of the Serial Port register set described using the Generic Register Address Structure*.<br><br>0 = console redirection disabled |
| Interrupt Type | 1 | 52 | Interrupt type(s) used by the UART.<br>Bit[0] PC-AT-compatible dual-8259 IRQ interrupt<br>Bit[1] I/O APIC interrupt (Global System Interrupt)<br>Bit[2] I/O SAPIC interrupt (Global System Interrupt) (IRQ)<br>Bit[3:7] reserved (must be 0)<br>0 = not supported<br>1 = supported |

FIG. 8A

| Field | Byte Length | Byte Offset | Description |
|---|---|---|---|
| IRQ | 1 | 53 | The PC-AT-compatible IRQ used by the UART.<br>2-7, 9-12, 14-15 = valid IRQs respectively<br>0-1, 8, 13, 16.255 = reserved<br>Valid only when Bit[0] of the Interrupt type field is set. |
| Global System Interrupt | 4 | 54 | The I/O APIC or I/O SAPIC Global System Interrupt Used by the UART.<br>Valid only when Bit[1] or Bit[2] of the Interrupt Type field is set. |
| Baud Rate | 1 | 58 | The baud rate the BIOS used for redirection.<br>3 = 9600<br>4 = 19200<br>6 = 57600<br>7 = 115200 |
| Parity | 1 | 59 | 0 = No Parity |
| Stop Bits | 1 | 60 | 1 = 1 Stop bit |
| Flow Control | 1 | 61 | Bit[0] = DCD required for transmit<br>Bit[1] = RTS/CTS hardware flow control<br>Bit[2] = XON/XOFF software control<br>Bit[3:7] = reserved, must be zero |
| Terminal Type | 1 | 62 | The terminal protocol the BIOS was using for console redirection:<br>0 = VT100<br>1 = VT100+<br>2 = VT-UFT8<br>3 = ANSI |
| Reserved | 1 | 63 | Must be 0 |
| PCI Device ID | 2 | 64 | Must be 0xFFFF when not a PCI device |
| PCI Vendor ID | 2 | 66 | Must be 0xFFFF when not a PCI device |
| PCI Bus Number | 1 | 68 | PCI Bus Number when table describes a PCI device<br>Must be 0x00 when not a PCI device |
| PCI Device Number | 1 | 69 | PCI Slot Number when table describes a PCI device<br>Must be 0x00 when not a PCI device |
| PCI Function Number | 1 | 70 | PCI Function Number when table describes a PCI device<br>Must be 0x00 when not a PCI device |
| PCI Flags | 4 | 71 | PCI Compatibility flags bitmask. Should be zero by default.<br>Bit[0] = Operating System should NOT suppress PNP device enumeration or disable power management for this device. Must be 0 if it is not a PCI device |
| PCI Segment | 1 | 75 | PCI segment number. |
| Reserved | 4 | 76 | Must be 0 |

FIG. 8B

SAC Commands                                    ⟋— 1102

| Command | Description |
|---|---|
| cmd | Creates Windows command-prompt channels. |
| crashdump | Manually generates a Stop error message and forces a memory dump file to be created. |
| D | Dumps the current kernel log. |
| F | Toggles the information output by the t-list command, to show processes only, or to show processes and threads. |
| I | When no parameters are passed, this command lists IP information. You can configure IP parameters to display or set the IP address, subnet mask, and gateway of a given network interface device by providing the network number, IP address, and subnet information, using the following format: < network#> <IPaddress> <subnet> |
| id | Displays identification information about the server. |
| K <PID> | Ends the given process. PID is the process identification number. |
| L <PID> | Lowers the priority level of a process (and any associated child processes) to a lowest possible level. |
| lock | Restricts access to Emergency Management Services command-prompt channels. |
| M <PID> <MB-allow> | Limits the memory usage of a process (and any associated child processes) to a specified number of megabytes. |
| P | Causes t-list command output to pause after displaying one full screen of information. |
| R <PID> | Raises the priority of a process and any associated child processes by one level. |
| restart | Restarts the computer. |
| S | When no parameters are passed, this command displays the current date using the 24-hour clock format. You can set the system time by providing the date and, optionally, the time in the format: mm/dd/yyyyhh:mm. |
| shutdown | Shuts down the computer. |
| T | Lists the processes and threads that are currently running. |
| ? or help | Lists the available commands. |

Channel-management Commands                     ⟋— 1104

| Command | Description |
|---|---|
| ch | Lists all channels. |
| ch -si <n> | Changes to the channel with the number, n. |
| ch -sn <name> | Changes to the channel with the name name. |
| ch -ci <n> | Closes the channel with the number, n. |
| ch -cn <name> | Closes the channel with the name name. |
| <Esc> <Tab> | Enables change of channels. |
| <Esc> <Tab> 0 | Returns to the SAC channel. |
| ch -? | Displays the channel-management commands Help. |

FIG. 11

METHOD AND SUBSYSTEM FOR DATA EXCHANGE BETWEEN A GUEST OPERATING SYSTEM AND A VIRTUALIZATION LAYER

TECHNICAL FIELD

The current document is directed to virtualization of computer systems and, in particular, to a method and subsystem that allows a virtualization layer to exchange data and commands with a guest operating system running within an execution environment provided by a virtual machine and the virtualization layer.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

While virtualization technologies have been used for many years to great advantage in a variety of different settings and applications, there remain many opportunities for the design and development of new features, facilities, and capabilities within virtualization layers, virtual machines, and other related virtualization technologies. Designers, developers, and vendors of virtualization technologies continue to seek new features, facilities, and capabilities to provide increasing ease of installation, ease of use, and various different desired functionalities and capabilities within virtualization products.

SUMMARY

The current document is directed to methods and subsystems for communication between virtualization layers and guest operating systems. A hardware baseboard management controller ("BMC") provides an out-of-band communications link and management interface to a computer system that can be accessed by a system administrator through a remote console. A virtualization layer may provide a virtualized BMC ("vBMC") that provides a data-and-command-exchange medium between a guest operating system and the virtualization layer. The virtualization layer may transmit commands, query status and configuration information, and transfer data through this data-and-command-exchange medium to the guest operating system.

BRIEF DESCRIPTION OF THE DRAWINGS

FIGS. 8A-B illustrate the various fields contained within the serial port console redirection table.

FIG. 11 provides two tables of SAC commands which illustrate one implementation of the SAC command interface provided to system administrators on a remote console.

DETAILED DESCRIPTION OF EMBODIMENTS

The current document is directed to methods and subsystems that provide a communications path between a virtualization layer and a guest operating system running within an execution environment provided by the virtualization layer and a virtual machine. In a first subsection, a brief overview of computer architecture and virtualization is provided, with reference to FIGS. 1-3. A second subsection discusses baseboard management controllers, advanced configuration and power interface tables, and system-administration consoles with reference to FIGS. 4-11. A third and final subsection discusses methods and subsystems for providing communication paths between virtualization layers and guest operating systems, with reference to FIGS. 12-15.

A Brief Overview of Computer Architecture and Virtualization

Figure 1:
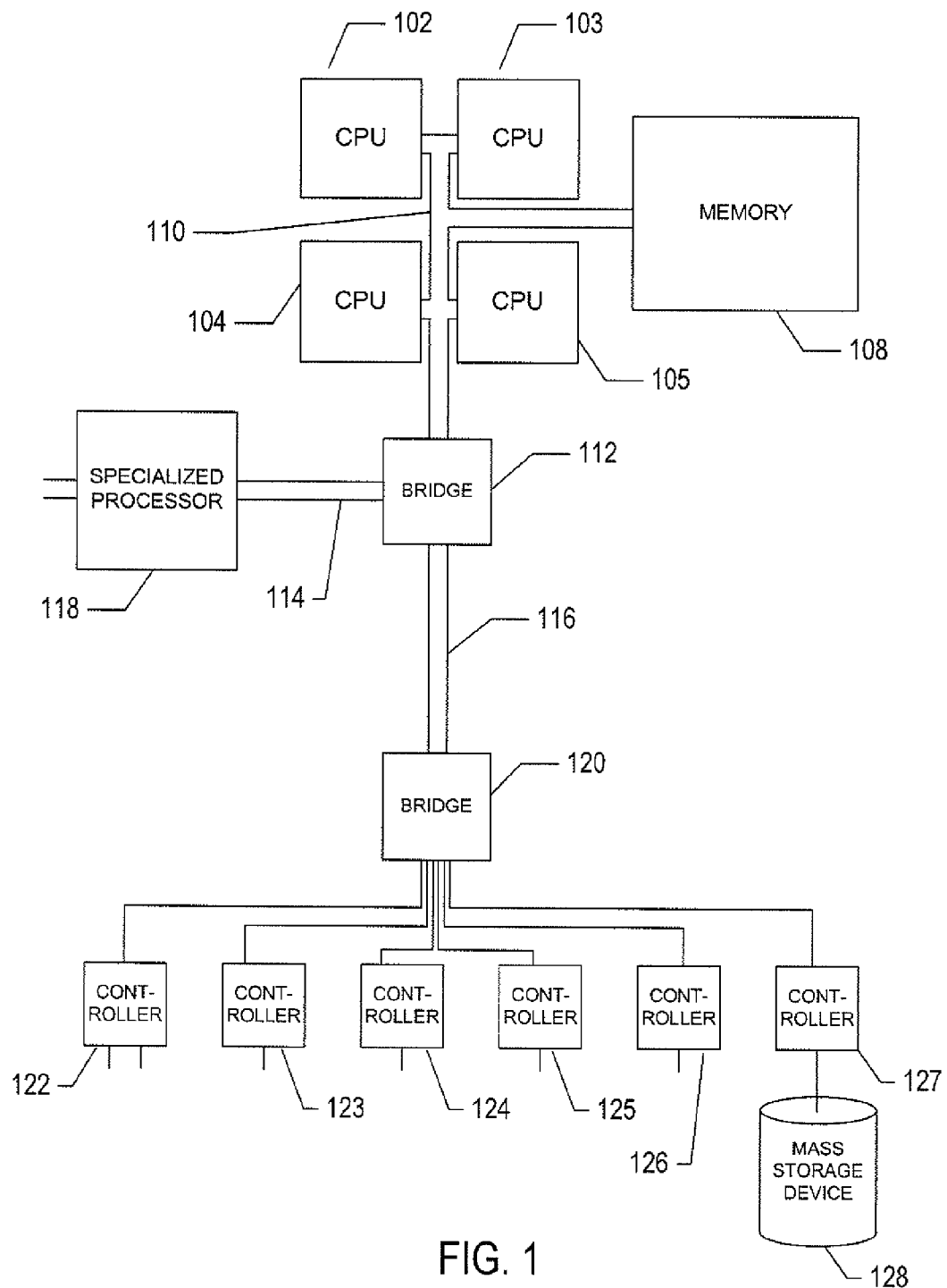
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
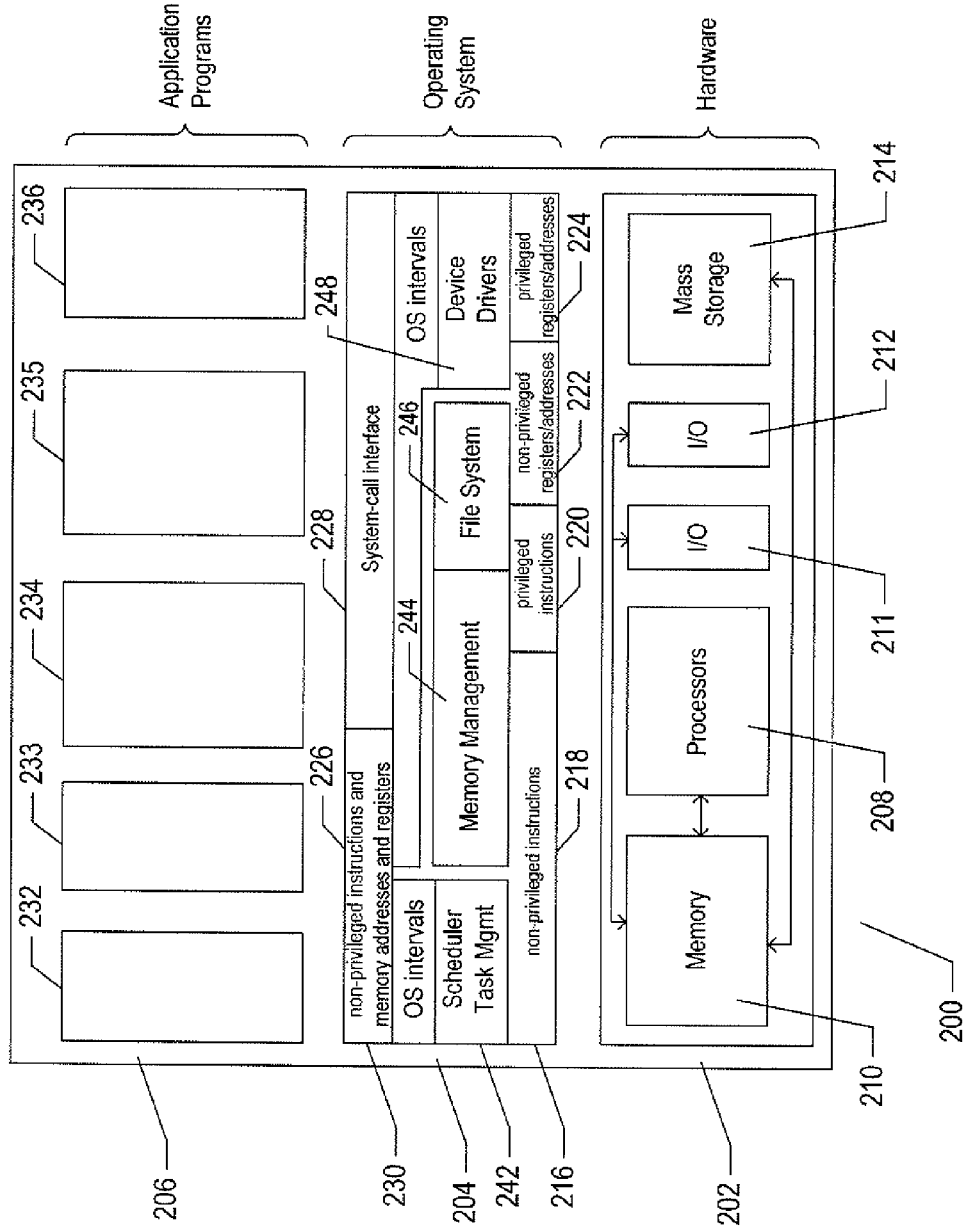
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 211 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged processor instructions 218, a set of privileged processor instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3A:
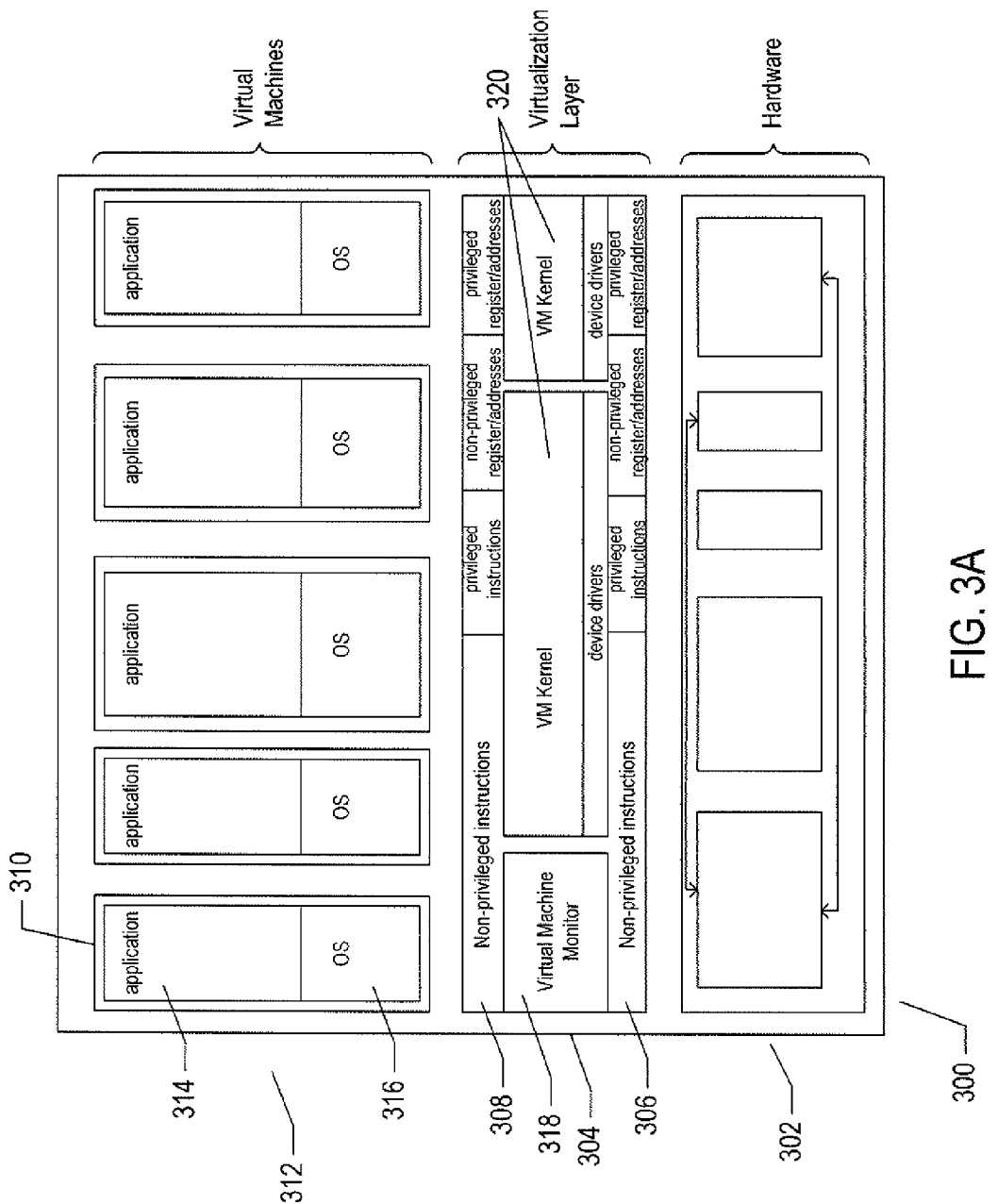
FIGS. 3A-B illustrate two types of virtual machine and virtual-machine execution environments.
Figure 3B:
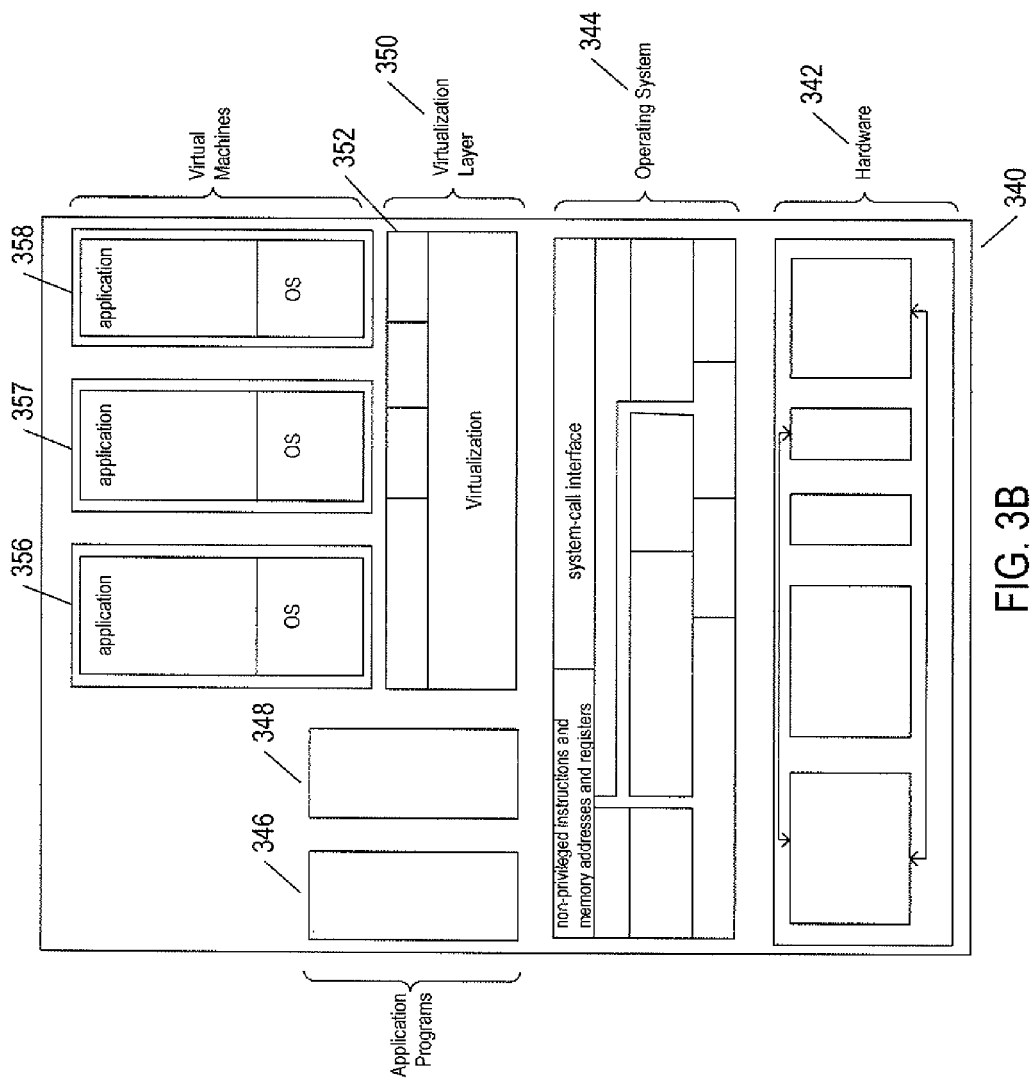

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 3A-B illustrate two types of virtual machine and virtual-machine execution environments. FIGS. 3A-B use the same illustration conventions as used in FIG. 2. FIG. 3A shows a first type of virtualization. The computer system 300 in FIG. 3A includes the same hardware layer 302 as the hardware layer 202 shown in FIG. 2. However, rather than providing an operating system layer directly above the hardware layer, as in FIG. 2, the virtualized computing environment illustrated in FIG. 3A features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 312. Each virtual machine includes one or more application programs or other higher-level computational entities packaged together with an operating system, referred to as a "guest operating system," such as application 314 and guest operating system 316 packaged together within virtual machine 310. Each virtual machine is thus equivalent to the operating-system layer 204 and application-program layer 206 in the general-purpose computer system shown in FIG. 2. Each guest operating system within a virtual machine interfaces to the virtualization-layer interface 308 rather than to the actual hardware interface 306. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 318 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 3B illustrates a second type of virtualization. In FIG. 3B, the computer system 340 includes the same hardware layer 342 and software layer 344 as the hardware layer 202 shown in FIG. 2. Several application programs 346 and 348 are shown running in the execution environment provided by the operating system. In addition, a virtualization layer 350 is also provided, in computer 340, but, unlike the virtualization layer 304 discussed with reference to FIG. 3A, virtualization layer 350 is layered above the operating system 344, referred to as the "host OS," and uses the operating system interface to access operating-system-provided functionality as well as the hardware. The virtualization layer 350 comprises primarily a VMM and a hardware-like interface 352, similar to hardware-like interface 308 in FIG. 3A. The virtualization-layer/hardware-layer interface 352, equivalent to interface 216 in FIG. 2, provides an execution environment for a number of virtual machines 356-358, each including one or more application programs or other higher-level computational entities packaged together with a guest operating system.

In FIGS. 3A-B, the layers are somewhat simplified for clarity of illustration. For example, portions of the virtualization layer 350 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 4:
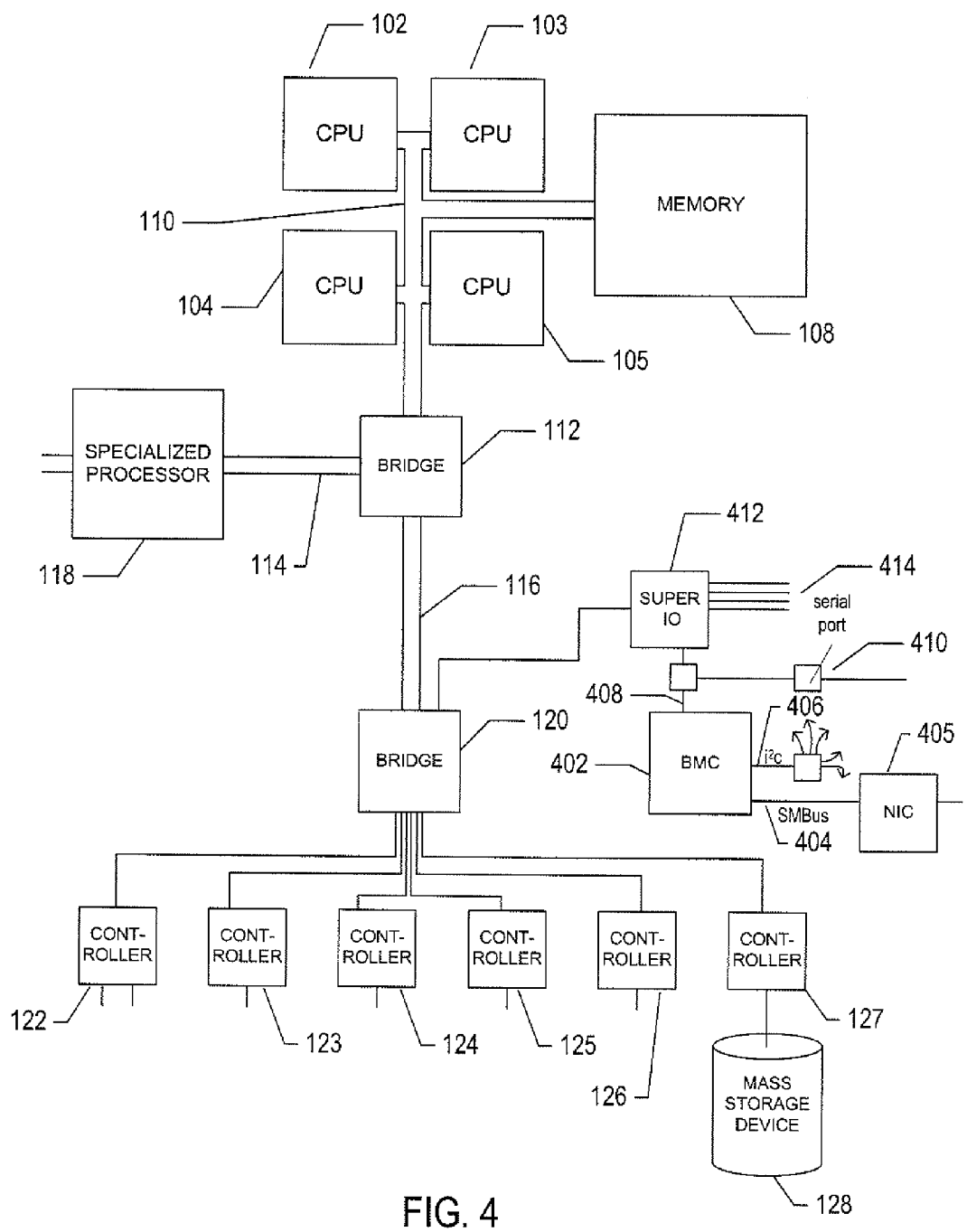
FIG. 4 illustrates a baseboard management controller ("BMC") within a server computer.

Baseboard Management Controllers, Advanced Configuration and Power Interface Tables, and System-Administration Consoles Certain servers and other computer systems are currently equipped with baseboard management controllers. FIG. 4 illustrates a baseboard management controller ("BMC") within a server computer. FIG. 4 uses illustration conventions similar to FIG. 1, but includes additional components. The BMC 402 is an integrated-circuit microcontroller that includes one or more processors, memory, communications ports, and firmware that implements communications protocols, a management interface, and provides additional functionalities and features. Certain modern BMCs may provide, for example, Internet connectivity and a management interface that can be accessed via a web browser. The BMC 402 in FIG. 4 is shown to be connected by a system management bus ("SMBus") 404 to a network interface card 405 that provides connectivity to the Internet via an Ethernet communications, an $i^2c$ bus 406 that interconnects the BMC with many different sensors within the server, including temperature sensors, status registers, and other such subcomponents that provide data useful for management and monitoring of the server hardware. The BMC is also connected, by a serial communications link 408, to either a dedicated serial port 410 or to a super I/O chip 412 through which the BMC may access various communications media 414 as well as system memory and other server components via bridge 120.

Figure 5:
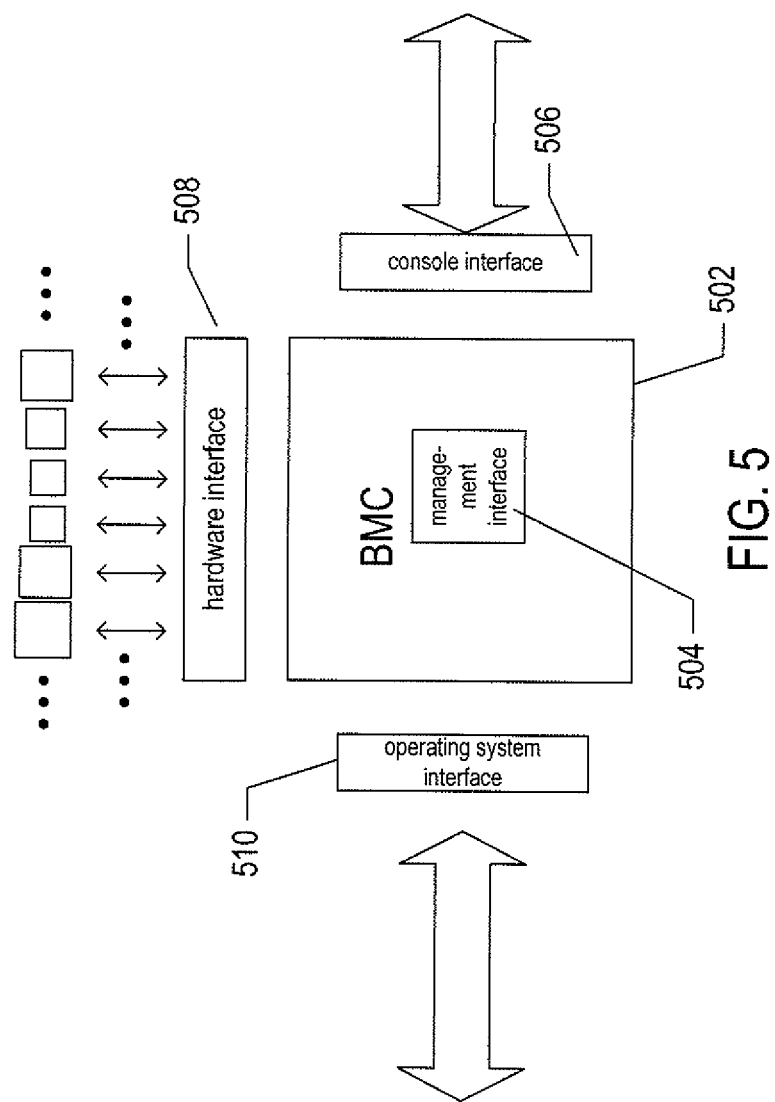
FIG. 5 illustrates the functional interfaces provided by a BMC.

FIG. 5 illustrates the functional interfaces provided by a BMC. The BMC 502 includes firmware that implements a management interface 504 to a variety of different monitoring, reporting, and power-management firmware routines embedded within the BMC. This management interface can be accessed via a remote console through a console interface 506 provided by the BMC. In many cases, the BMC may provide a VT-100 or similar console interface through a dedicated serial port. In other cases, the BMC provides an interface through the Internet that can be accessed through a web browser. Certain BMCs provide both types of console interfaces. The console interface generally allows a human system administrator to access the management interface from an external console device in order to display various types of information with respect to the status of hardware and operating-system components of the server. The console interface may allow system administrators and other users to issue various types of commands to the management interface, including commands passed by the BMC to the operating system executing within the server, may allow updating of the server's firmware, including the basic input/output system ("BIOS") or extensible firmware interface ("EFT"), and may provide alerts and information about hardware error conditions that occur during server operation. In certain cases, the BMC may essentially pass through an operating-system-provided console interface to a remote device. In other cases, the BMC may access a console interface provided by the operating system in order issue commands and/or input various types of data to the operating system in order to support a BMC-generated administrative interface provided by the BMC to administrators via the serial link or through a web interface, allowing administrators to issue commands to the BMC that the BMC then implements through the BMC's hardware interface or through the operating-system-provided console interface or other operating-system interfaces accessible to the BMC. Thus, the BMC can serve as a window through which an operating-system provided console interface is made available to local and remote administrators as well as an intelligent port into the operating system through which external commands and data are received, interpreted, and translated by the BMC into various internal commands and requests directed to server hardware and the server operating system.

The BMC provides a hardware interface 508 that allows the BMC to interact with various types of hardware components within the server, including controlling fans and other cooling devices, controlling various buttons and displays, and collecting many different types of data during monitoring of server operation from sensors and status registers. As discussed above, the operating system generally provides a console interface and, in certain cases, additional interfaces to the BMC that allow the BMC to interact with the operating system in order to provide various types of management and administrative interfaces to entities and devices external to the server. The BMC may also provide an operating-system interface 510 that allows the operating system to retrieve management information from the BMC as well as to use the BMC-provided console interface to provide an operating-system-implemented administration and command interface to system administrators and other personnel on the external console. The external console may also be a remote, emulated console or may be a remote monitoring and management application that uses information obtained over the dedicated serial communications medium provided by the BMC firmware and operating system to carry out remote system configuration, monitoring, and management.

Figure 6:
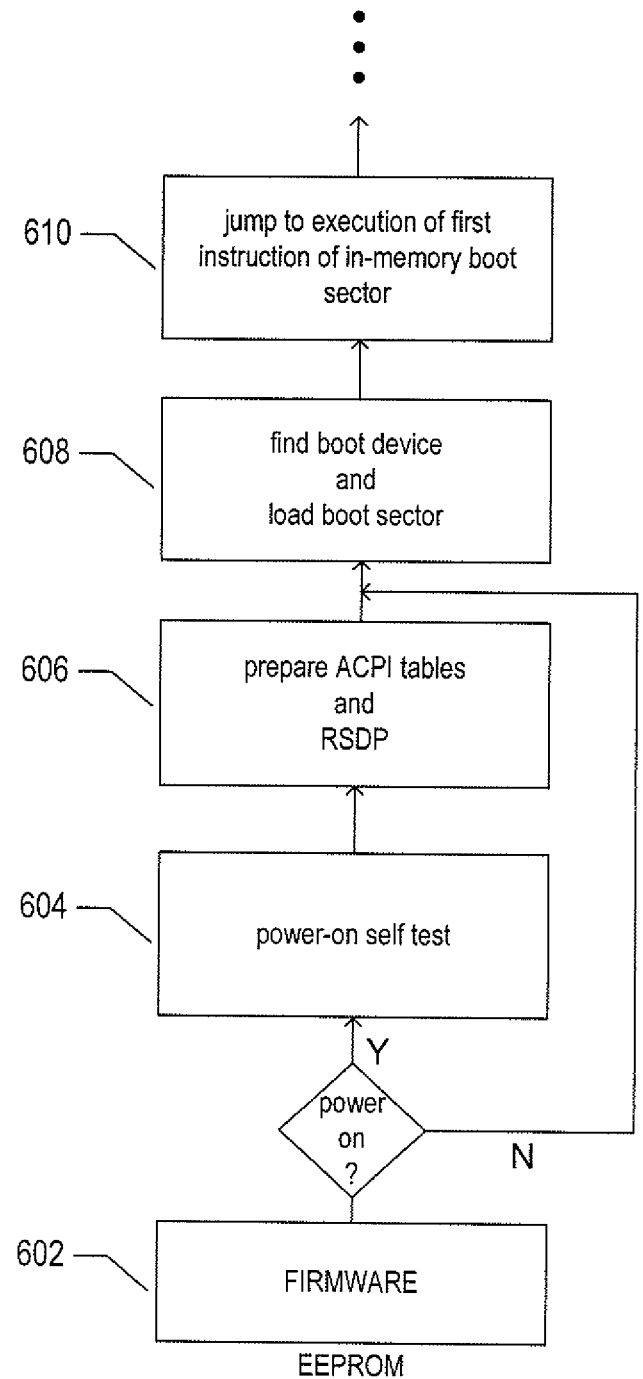
FIG. 6 illustrates a portion of the boot process that initializes a server computer following a power-on event or a reset event.

Information about the hardware environment of the system controlled by an OS and in which a BMC resides is stored in memory during a booting process carried out by firmware after a system power-on or reset event. The information is accessible to the BMC and OS during system operation. FIG. 6 illustrates a portion of the boot process that initializes a server computer following a power-on event or a reset event. Following a power-on or reset event, firmware stored within a non-volatile instruction-storage device of the server, such as an EEPROM 602, is executed. A basic input/output system ("BIOS") is one example of the firmware executed following a power-on or reset. In the case of a power-on event, the firmware carries out a power-on self-test 604 that identifies, initializes, and tests various system devices, including one or more CPUs, random-access-memory ("RAM") devices, interrupt and direct-memory-access ("DMA") controllers, a video display card, a keyboard, mass-storage devices, an optical-disk drive, and other such hardware subsystems. The firmware then prepares and stores, at a known, predetermined location in system memory, a set of advanced-configuration-and-power-interface ("ACPI") tables that described the identified hardware components as well as a root system description pointer ("RSDP") that provides a reference to the ACPI tables 606. Then, whether in response to a power-on event or a reset event, the firmware searches for a boot device, such as an optical-disk drive, read-only memory ("ROM"), USB flash drive, or other such device, using a predetermined search order. Upon finding a boot device, the firmware loads a first boot sector from the boot device into system memory 608 at a predetermined location. The firmware checks the loaded sector to ensure that the boot sector has been loaded into memory successfully and without corruption. Then, in step 610, the firmware executes a jump instruction to the first instruction of the in-memory boot sector loaded into system memory. The boot sector then controls loading of the operating system into system memory and transfer of execution control to the operating system.

Figure 7:
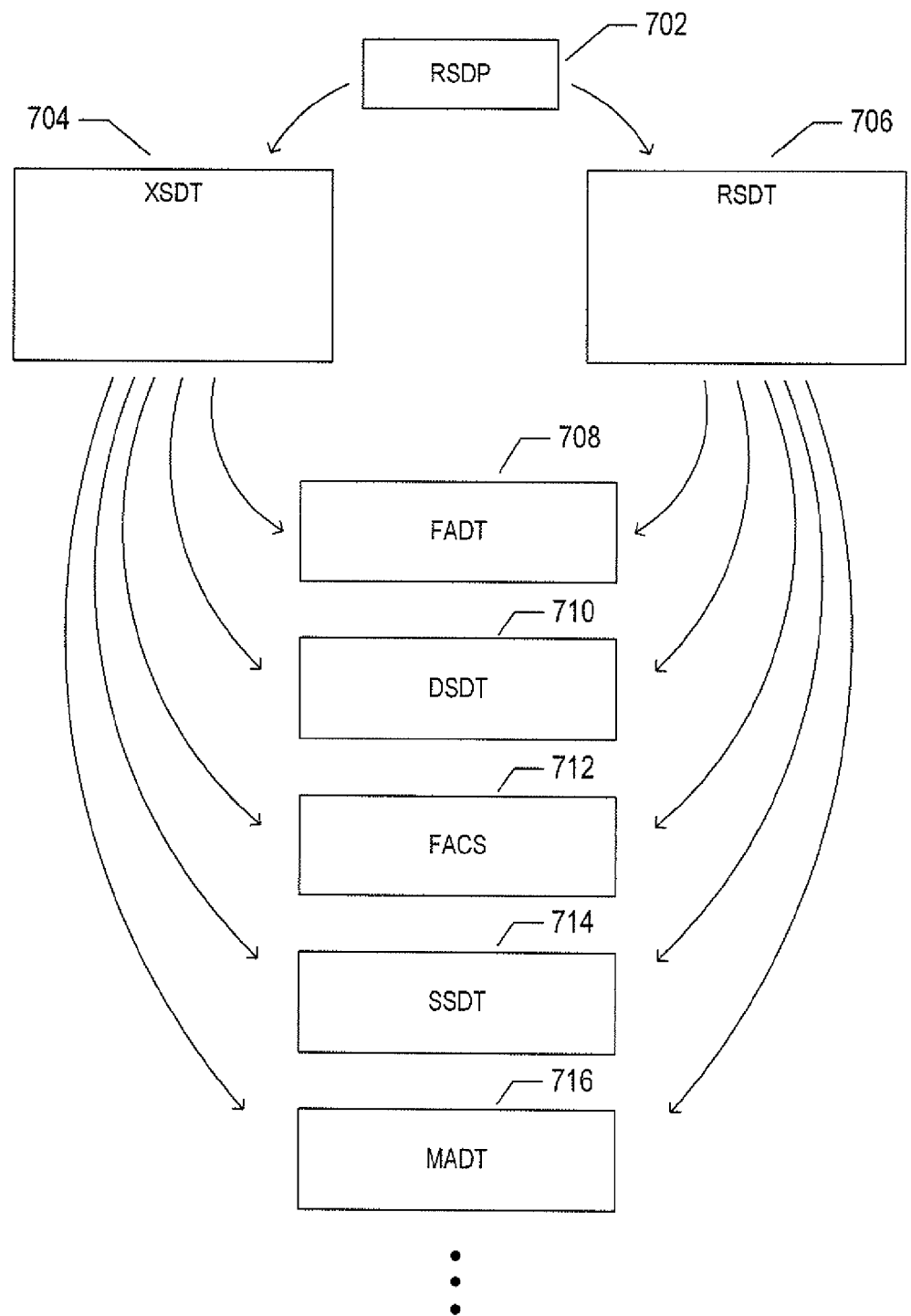
FIG. 7 illustrates the organization of advanced-configuration-and-power-interface ("ACPI") tables.

FIG. 7 illustrates the organization of advanced-configuration-and-power-interface ("ACPI") tables. The root system description pointer ("RSDP") 702 points to an extended system description table ("XSDT") 704 and a root system description table ("RSDT") 706. The XSDT contains 64-bit pointers to additional ACPI tables and the RSDT 706 includes 32-bit pointers to the additional ACPI tables. There are many additional ACPI tables including the fixed ACPI description table 708, the differentiated system description table 710, the firmware ACPI control structure 712, the secondary system descriptor table 714, and the multiple ACPI description table 716. All of these tables, including many additional ACPI tables not illustrated in FIG. 7, provide a data interface between an ACPI-compliant operating system and system firmware, describing the system hardware in a platform-independent manner.

The ACPI tables may additionally include a serial port console redirection table. FIGS. 8A-B illustrate the various fields contained within this table. The serial port console redirection table is used by Microsoft Windows® operating systems to determine whether there is a serial port or non-legacy universal asynchronous receiver/transmitter ("UART") interface available for use with the Microsoft Windows emergency management services and special administration console. This table, as one example, may direct an operating system to the BMC console interface. Thus, the ACPI tables, including the serial port console redirection table ("SPCRT"), describe the underlying hardware platform to an operating system to allow an operating system to access various hardware-supplied interfaces, including the BMC console interface.

Figure 9:
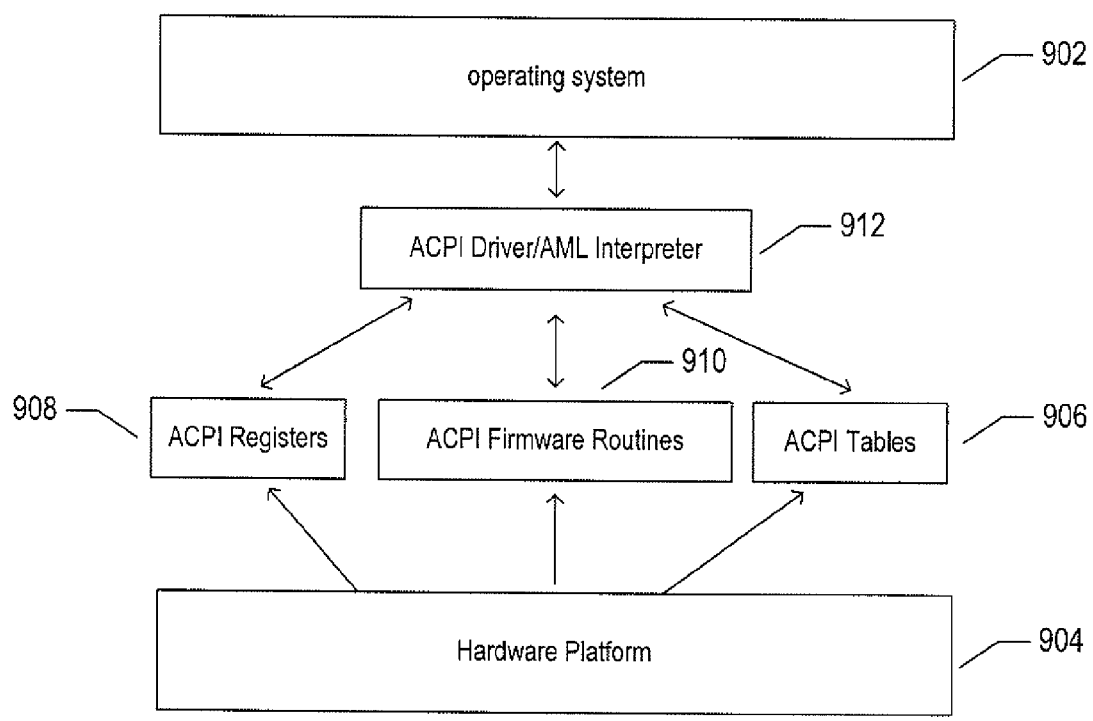
FIG. 9 illustrates the ACPI interface.

FIG. 9 illustrates the ACPI interface. As shown in FIG. 9, in a non-virtualized computer system, an operating system 902 executes above a hardware platform 904. The firmware within the hardware platform prepares, during the initialization process, the ACPI tables 906 and provides a set of ACPI registers 908 in system memory or as hardware registers as well as a set of ACPI firmware routines 910. The operating system, once loaded and initialized, accesses the ACPI registers, ACPI tables, and ACPI firmware routines through an ACPI driver and ACPI-machine-language ("AML") interpreter 912. This facilitates operating-system monitoring and management of hardware components of the hardware platform.

Figure 10:
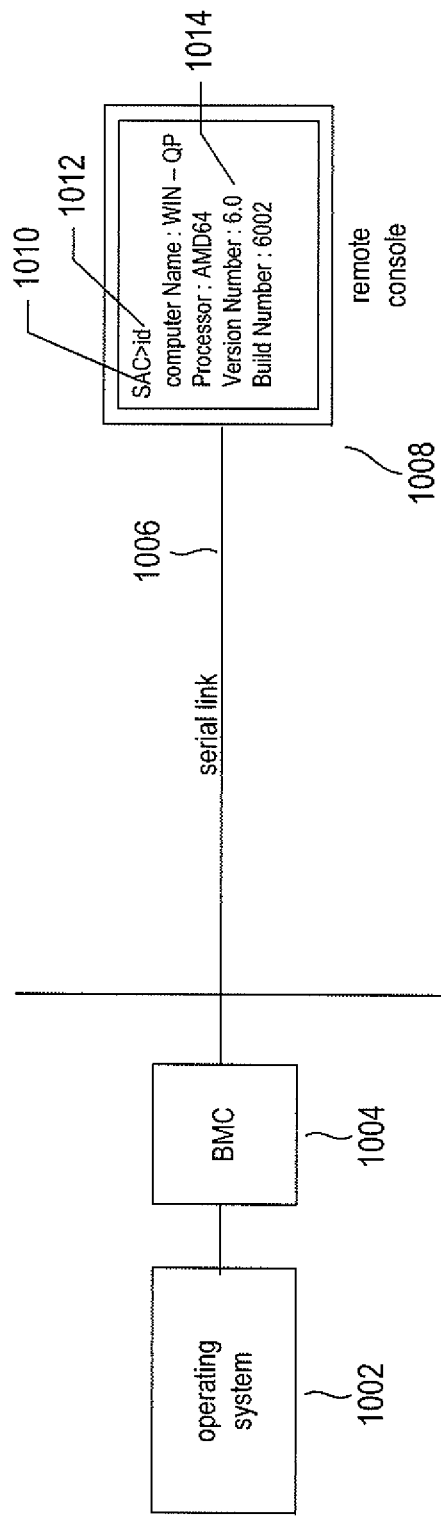
FIG. 10 illustrates the special administration console provided by certain Microsoft Windows® operating systems.

FIG. 10 illustrates the special administration console provided by certain Microsoft Windows® operating systems. In certain cases, the operating system 1002 interfaces to the BMC 1004 to access management information maintained by the BMC as well as to access the dedicated serial link provided by the BMC 1006 to a remote console 1008, on which the operating system provides a special administration console ("SAC") prompt 1010 to which a system administrator issues various commands, such as the "id" command 1012 that results in display, by the operating system, of hardware identification information 1014 on the remote console. FIG. 11 provides two tables of SAC commands which illustrate one implementation of the SAC command interface provided to system administrators on a remote console. A first table 1102 lists various SAC commands and a second table 1104 lists various SAC channel-management commands. This SAC command interface is an example of a variety of different command interfaces that may be provided by various different operating systems for accessing management information, issuing configuration commands, and issuing commands to halt the system, dump logs and memory contents to files, and to carry various other management and administration tasks. As discussed above, the operating system, in turn, provides a console interface to the BMC, which allows BMC routines to issue commands and requests to the operating system in order to implement a BMC administrative interface provided by the BMC to external entities.

Methods and Subsystems for Providing Communication Paths Between Virtualization Layers and Guest Operating Systems When a virtualization layer is present within a computer system, as illustrated in FIGS. 3A-B, the guest operating systems, such as guest operating system 316, within virtual machines, such as virtual machine 310, interact with the virtualization layer through the relatively thin interface 308 comprising non-privileged instructions, privileged instructions, non-privileged registers and memory addresses, and privileged registers and memory addresses. In many cases, the guest operating system is unaware of the fact that the guest operating system is executing within a virtual environment. Therefore, in many cases, there is no communications path between the virtualization layer, such as the VM kernel or VMM, and guest operating systems. Even when operating systems include various hooks and interfaces that allow the operating system to determine that it is running in a virtual environment, the ability of the operating system and underlying virtualization layer to communicate and exchange information is generally severely constrained.

Figure 12:
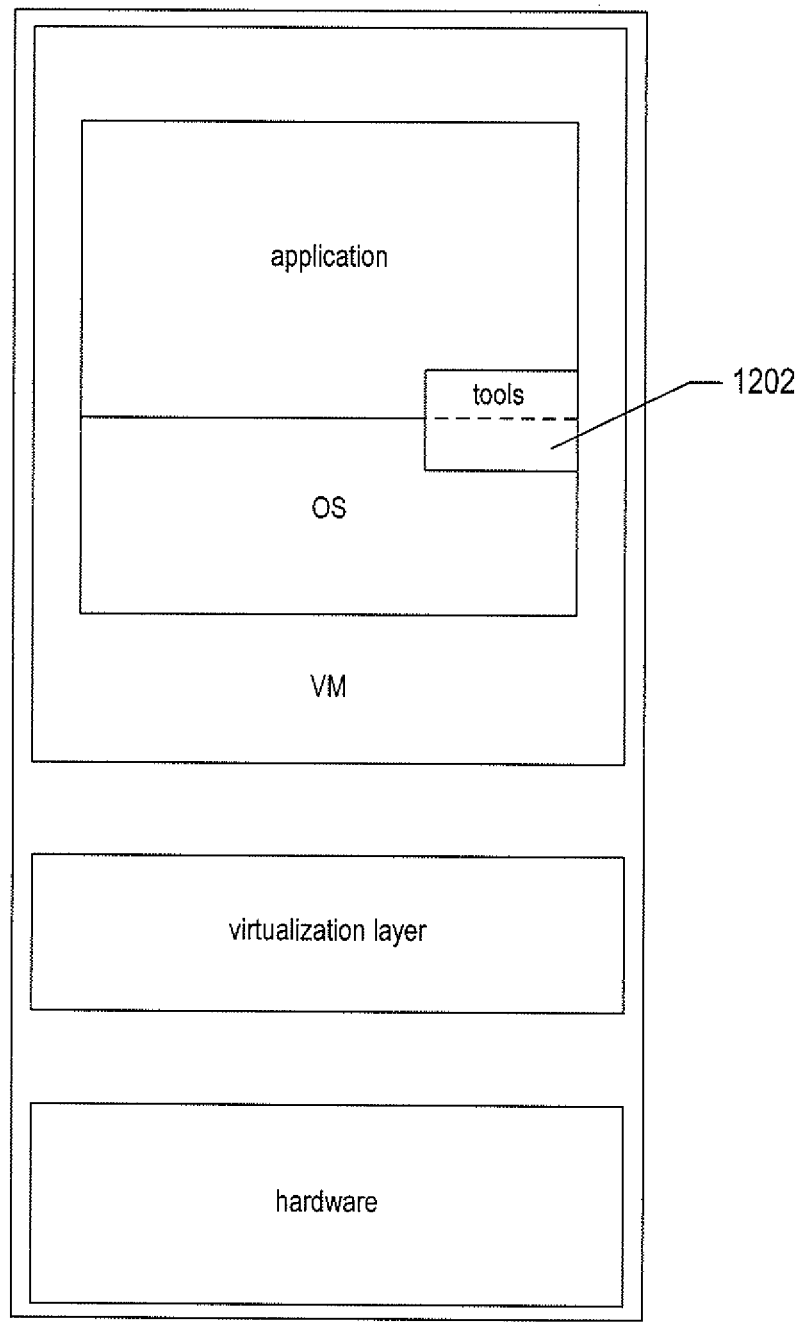
FIG. 12 illustrates routines and other functionalities collectively referred to as "tools."

In many cases, the virtualization layer may need to supply various types of routines and functionalities to a guest operating system in order to facilitate or improve execution of the guest operating system within the virtualized environment. FIG. 12 illustrates these routines and other functionalities, collectively referred to as "tools." The tools 1202 may include drivers and dynamic-link libraries that are essentially incorporated within the guest operating system as well as application-like routines that may straddle the operating-system/application-program boundary. The tools provide a wide variety of functionalities. For example, the tools may include video drivers that enhance the graphic-display functionalities provided by virtual display devices. These tools may include mouse-control routines and system-time functionality. Additional tools provide drivers for allocation and deallocation of memory by guest operating systems to facilitate sharing of memory resources by multiple executing virtual machines. These are but a few examples of many different types of tools that may be provided by a virtualization-layer vendor to facilitate guest-operating-system execution within virtual machines.

Because there is generally no direct path for exchange of data between the virtualization layer and guest operating systems, the tools discussed in the preceding paragraph are generally supplied to the guest operating system via removable data-storage medium, such as an optical disk. However, there are a variety of problems associated with introducing tools into guest operating systems in this fashion. For one thing, introducing the tools involves an inconvenient, often manual installation procedure which may result in confusing and delaying system administrators. Furthermore, verification and certification of particular versions of the tools may be required for enterprise data centers and cloud-computing facilities. In addition, introduction of tools may be associated with risks, including introduction of bugs. For these and many other reasons, the current techniques for providing tools by virtualization-layer vendors to guest operating systems is associated with significant drawbacks and deficiencies.

Figure 13:
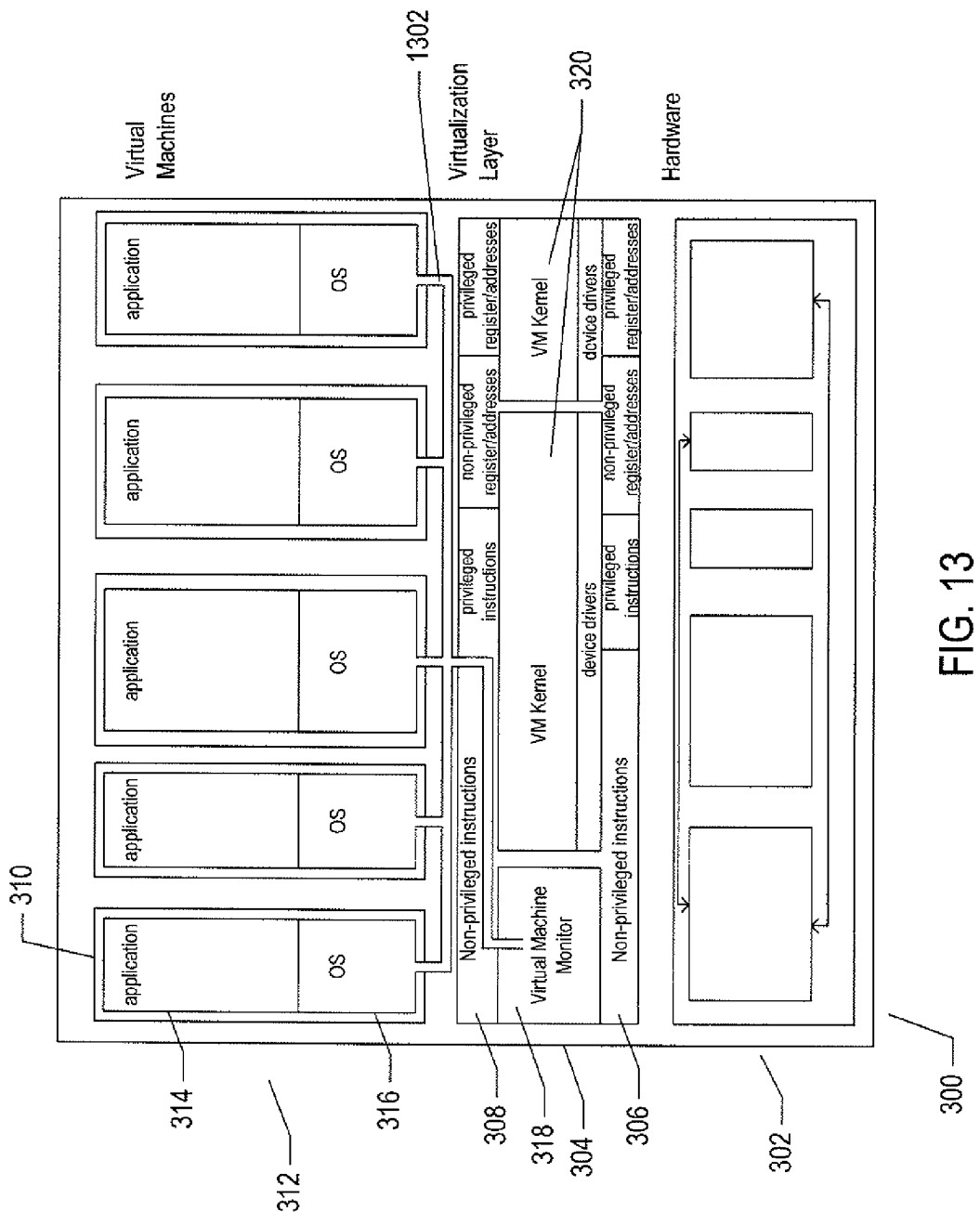
FIG. 13 illustrates a desired alternative approach to furnishing executable routines and other data by a virtualization layer to guest operating systems.

FIG. 13 illustrates a desired alternative approach to furnishing executable routines and other data by a virtualization layer to guest operating systems. FIG. 13 uses the same illustration conventions as FIGS. 3A-B. However, in addition to the interfaces and features described in FIG. 3A, FIG. 13 shows a relatively direct communications pathway 1302 between the VMM 318 and guest operating systems, such as guest operating system 316. With such a direct communications pathway available, tool executables can be directly transferred to guest operating systems from the virtualization layer, rather than needing to be manually installed through an installation process. Additionally, in many cases, all or portions of certain tool functionalities may be alternatively implemented through configuration and management commands and interfaces provided by guest operating systems to system administrators through already existing configuration and management interfaces, such as the SAC interface discussed in the preceding subsection.

Figure 14A:
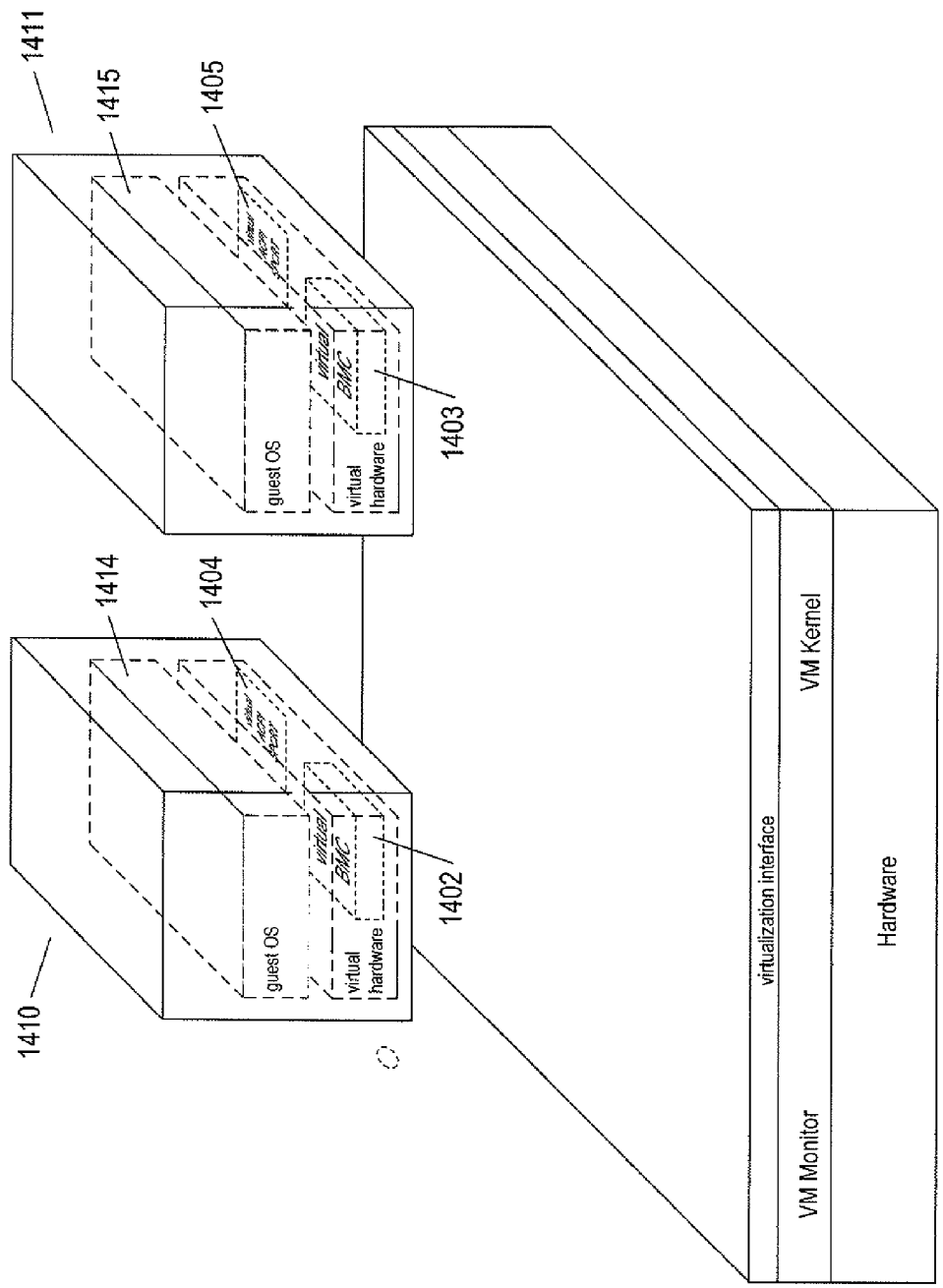
FIGS. 14A-B and 15 illustrate one implementation of a direct data-and-command-exchange pathway between the virtualization layer and guest operating systems within a virtualized computing environment.
Figure 14B:
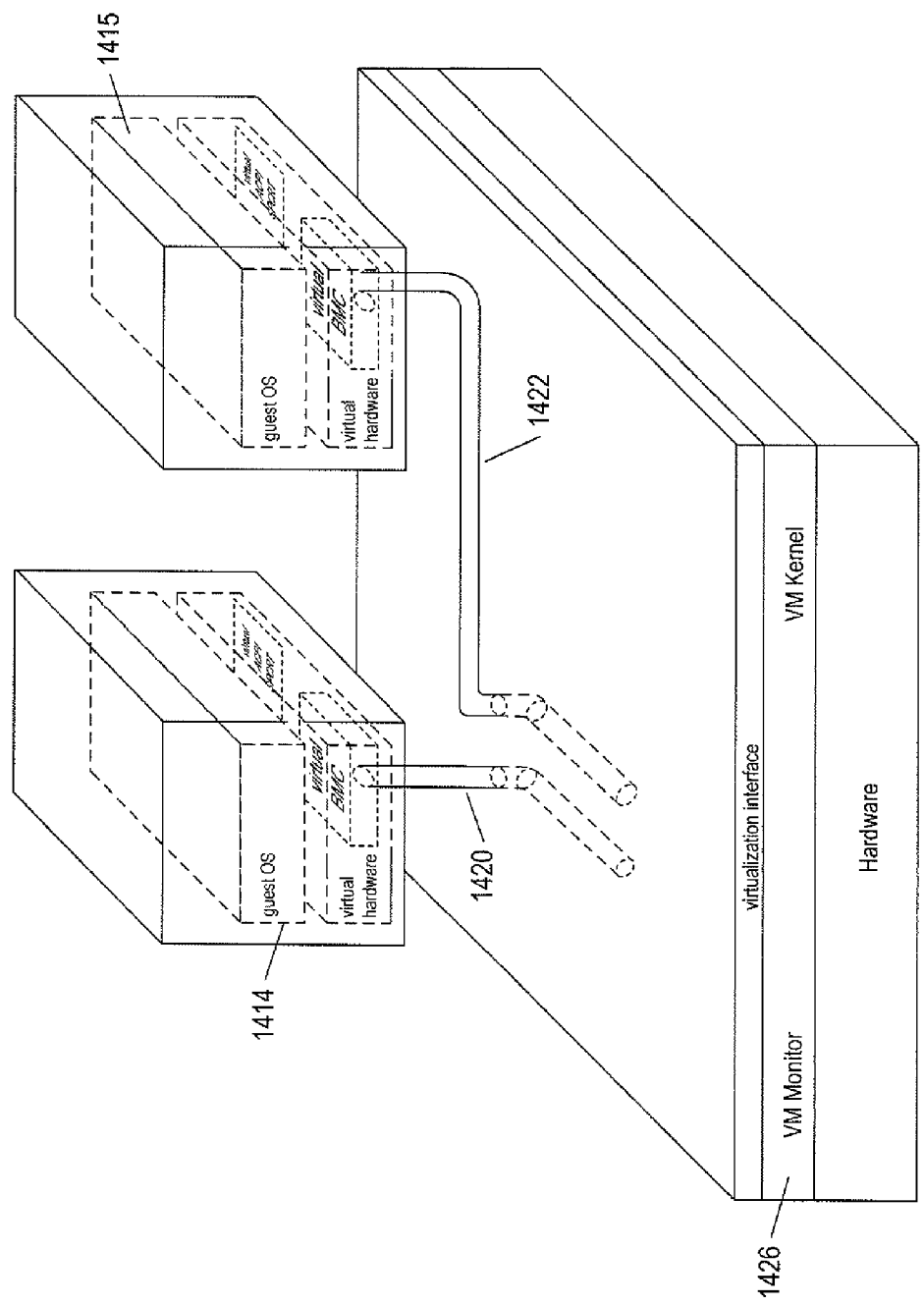
Figure 15:
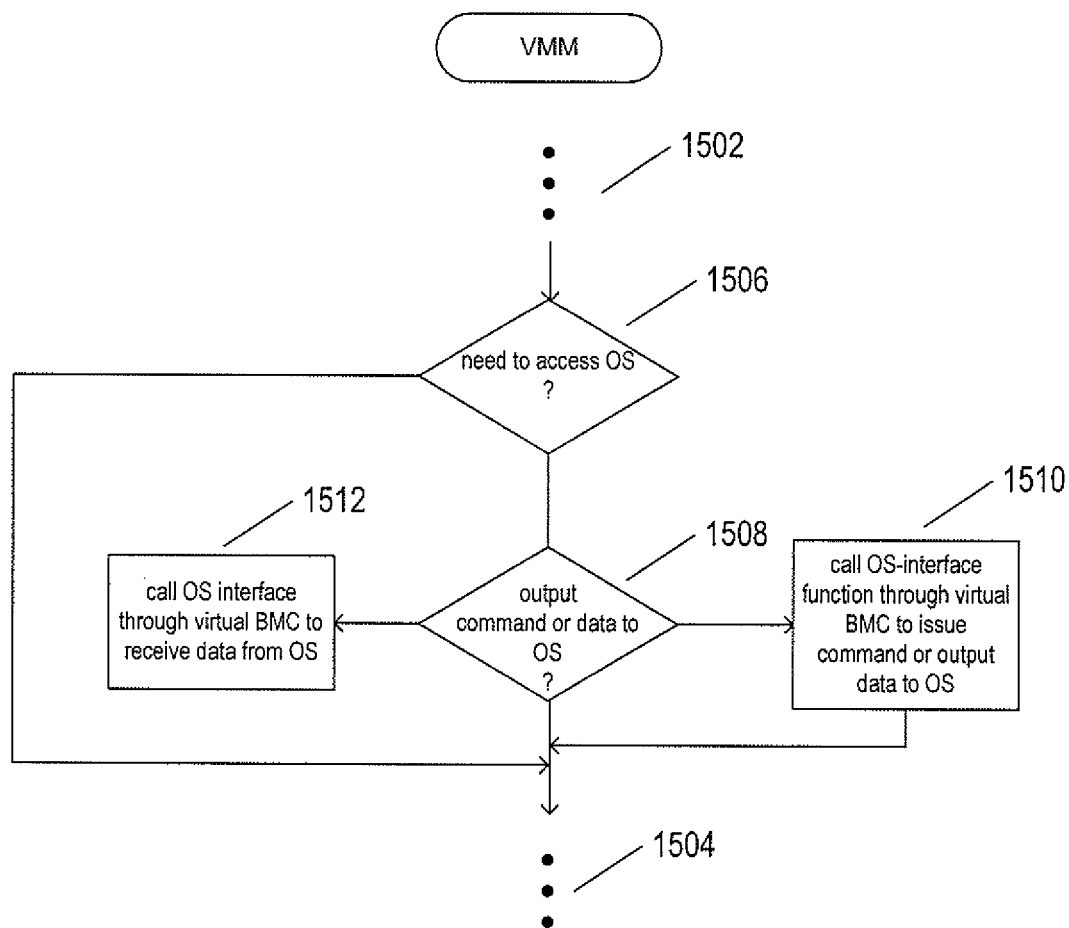

FIGS. 14A-B and 15 illustrate one implementation of a direct data-and-command-exchange pathway between the virtualization layer and guest operating systems within a virtualized computing environment of the type shown in FIG. 3A. In general, the virtualization layer is responsible for management of the underlying hardware platform, rather than a particular guest operating system. The virtualization layer generally interacts directly with the firmware and hardware system management components for configuration and management of the hardware. The virtualization layer may also provide a console interface to system administrators, much like the console interface provided by the BMC and/or operating system in a non-virtualized environment. Because many of the features and facilities provided by BMCs and operating-system functionalities that use the BMC have not been widely recognized for their potential utility in virtualized environments, and because virtualization of a BMC has been therefore viewed as likely to involve implementation efforts that would not be commensurate with any benefits that would be provided by virtualizing the BMC, virtualization layers have not, to date, provided a virtual BMC to guest operating systems. The BMC and operating-system facilities that employ the BMC is, in essence, a type of unused feature within virtualized computing environments. However, in order to obtain a direct communications pathway between the virtualization layer and guest operating systems, the virtualization layer can, as shown in FIG. 14, provide a virtual BMC 1402-1403 and can include a virtual ACPI SPCRT 1404-1405 within the virtual hardware layer provided to each virtual machine 1410 and 1411.

Implementation of a virtual BMC essentially involves developing a virtual BMC interface that mirrors the interface normally provided by a BMC via a serial link to an operating system. When a guest operating system writes particular values to registers associated with the serial link, the VMM needs to simulate an actual BMC's response. In many cases, only a subset of actual BMC behavior may need to be simulated by the VMM, when only that subset is accessed by the guest operating system.

The guest operating systems 1414 and 1415 of the VMs 1410 and 1411 then interface to a virtual BMC console interface to provide a SAC or SAC-like console interface. However, because the BMC is virtualized, the VMM, rather than a human system administrator accessing the management services via a remote console, receives the SAC or SAC-like interface data provided by the guest operating system. Thus, the virtual BMC provides a direct communications path between the VMM and each of multiple guest operating systems executing within a virtual environment provided by the virtualization layer. In essence, the VMM uses the virtual BMCs as portals to the guest OSs, to allow the VMM to issue commands and transmit data to the guest OSs. The VMM can additionally use the virtual BMCs as windows through which the VMM can receive data from the guest OSs through a console interface. FIG. 14B illustrates the virtual BMCs providing data-and-command-exchange media 1420 and 1422 between guest OSs 1414 and 1415 and the VMM 1426. It should be noted that a similar technique can be employed for creating a direct data-and-command-exchange pathway between the virtualization layer and guest operating systems within a virtualized computing environment of the type shown in FIG. 3B.

Certain operating-system interfaces, such as administrative consoles, do not directly provide file transfer facilities. However, there are many ways to provide such functionality through a virtualized BMC. Simulated keyboard input to an administrative console can be written to a file within the file system. Alternatively, data can be extracted from an input file, encoded in various text-based representations used for encoding emails, and transferred to the guest operating system, which can then convert the text-based representation back to a file of the input file type. Alternatively, the console/virtualized-BMC machinery can be used to transfer a reference to a file, and then any of available file-transfer utilities can be used to actually transfer the file data from the virtualization layer to the guest operating system. Additionally, the BMC may provide a file-transfer facility. In certain implementations, the file-transfer utility may employ VMM features and facilities for transferring files to virtual data-storage devices.

FIG. 15 illustrates use of the direct data-and-command-exchange pathway between the virtualization layer and guest operating systems within a virtualized computing environment by a VMM. FIG. 15 shows a small section of a larger VMM routine or module. Ellipses 1502 and 1504 represent steps and logic that precede and follow the section of the routine or module illustrated in FIG. 15. In step 1506, the VMM determines whether or not access to a guest OS is needed. When access to a guest OS is needed by the VMM, then, in step 1508, the VMM determines whether or not the VMM needs to issue a command or transmit data to guest OS or receive data from the guest OS. In the former case, the VMM uses the virtual BMC to access an OS interface to issue a command or transmit data, in step 1510. Otherwise, in step 1512, the VMM accesses an OS interface through the virtual BMC to receive data from the OS.

The OS interface accessible to the virtual machine monitor through the virtual BMC may provide a variety of different types of commands, data input, and data output. Commands may allow the virtual machine monitor to direct the guest operating system to alter the priorities of executing processes, launch processes, halt processes, shut down the guest operating system, configure resources, start up and power down various virtual hardware devices and add or remove hardware and software components, and carry out other types of control and management operations. The virtual machine monitor may input files and other data to virtual data-storage devices. The virtual machine monitor may request from the guest operating system various types of data that describe the current configuration and operational status of the guest operating system, including information about currently executing processes, including the number, types, and resource usage of the processes, memory usage, and other such information.

Because, in certain implementations, the virtualization uses a simulated interaction with an administration console to issue commands and transfer data to a guest operating system, and because VMs can be suspended and resumed, care needs to be taken to ensure that the virtualization layer completes any already-started command or data-transfer operation through the console interface and virtualized BMC prior to suspending the VM or that simulated interactions are properly logged and surrounded by commit/rollback functionality to ensure that suspension and resumption of VMs does not interfere with the logic and sequencing of virtualization-layer-initialized operations through the console interface and virtualized BMC.

Although the present invention has been described in terms of particular embodiments, it is not intended that the invention be limited to these embodiments. Modifications within the spirit of the invention will be apparent to those skilled in the art. For example, any of various different alternative mechanisms can be used, in addition to ACPI tables, to direct to a guest operating system to a console interface for providing a maintenance and management and configuration interface that can be virtualized by the virtualization layer in order to provide a communications pathway between the virtualization layer and the guest operating system. Any of various different design and implementation parameters, including control structures, data structures, modular organization, programming language, and specific virtualization of specific hardware and firmware features may be altered and varied in order to provide alternate implementations of the virtualization-layer-to-guest-operating-system communications pathway. BMC virtualization may include functionality that allows a VM owner to authorize administrators of a commercial system hosting the VM to provide or to be provided user accounts with specified associated permissions and policies in order to restrict and constrain the types of virtualized-BMC-facilitated-activities that the administrators can carry out. In this way, the virtualized-BMC-based communications link between the virtualization layer and guest operating systems does not provide unrestricted access by administrators to guest operating systems within VMs hosted by commercial computing facilities.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method that provides a command-and-data interface from a guest operating system to a virtual machine monitor, the method comprising:
    providing, by a virtual machine monitor, a virtual baseboard management controller within a virtual hardware interface implemented as computer instructions stored in one or more physical data-storage devices and executed on one or more physical processors of a physical computer system;
    recognizing, by a guest operating system, information describing the virtual baseboard management controller during guest-operating-system booting;
    providing, by the guest operating system, a console interface through the virtual baseboard management controller; and
    inputting, by the virtual machine monitor, one or more of data and commands to the guest-operating-system-provided console interface through the virtual baseboard management controller.

2. The method of claim 1 wherein the virtual machine monitor issues, through the virtual baseboard management controller, commands that direct the guest operating system to carry out one or more of:
    altering the priorities of executing processes;
    launching processes;
    halting processes;
    shutting down the operating system;
    restarting the operating system;
    configuring resources;
    configuring hardware/software components;
    starting up and powering down various virtual hardware devices;
    adding hardware and software components; and
    removing hardware and software components.

3. The method of claim 1 wherein the virtual machine monitor inputs, through the virtual baseboard management controller, data including files and other data for storage in one or more virtual data-storage devices.

4. The method of claim 1 wherein the virtual machine monitor receives from the guest operating system, through the virtual baseboard management controller, data including:
    data that describes the number, types, and resource usage of currently executing processes;
    data that describes current memory usage; and
    additional data that describes a current configuration and an operational status of the guest operating system.

5. The method of claim 1 wherein the virtual baseboard management controller provides a file-transfer utility.

6. The method of claim 5 wherein the virtual-baseboard-management-controller-provided file-transfer utility uses a virtual-machine-monitor facility for transferring data to virtual-data-storage devices.

7. The method of claim 1 wherein the virtual baseboard management controller includes functionality that allows an owner of a virtual machine, executing within a commercial system that hosts the virtual machine, to authorize one or more administrators of the commercial system to provide or to be provided user accounts with specified associated permissions and policies in order to restrict and constrain the types of virtual-baseboard-management-controller facilities that the one or more administrators can access.

8. A communications subsystem in a virtualized computer system that provides, to a virtual machine monitor, a command-and-data interface to a guest operating system, the communications subsystem comprising:
    a virtualized baseboard management controller interface, recognized by the guest operating system during booting, implemented as computer instructions stored in one or more physical data-storage devices and executed on one or more physical processors of a physical computer system; and
    a management interface provided by the guest operating system through the virtualized baseboard management controller and a virtualized communications medium that allows the virtualization layer to issue commands to the guest operating system, transfer data to the guest operating system which stores the data in one or more physical data-storage devices, and receive data in response to issued commands from the guest operating system.

9. The communications subsystem of claim 8 wherein the virtual machine monitor initializes one or more tables that describe the virtualized baseboard management controller to the guest operating system that, in a non-virtualized computer system, are prepared by firmware upon power up or restart.

10. The communications subsystem of claim 8 wherein the virtual machine monitor issues, through the virtual baseboard management controller, commands that direct the guest operating system to carry out one or more of:
   altering the priorities of executing processes;
   launching processes;
   halting processes;
   shutting down the operating system;
   restarting the operating system;
   configuring resources;
   configuring hardware/software components;
   starting up and powering down various virtual hardware devices;
   adding hardware and software components; and
   removing hardware and software components.

11. The communications subsystem of claim 8 wherein the virtual machine monitor inputs, through the virtual baseboard management controller, data including files and other data for storage in one or more virtual data-storage devices.

12. The communications subsystem of claim 8 wherein the virtual machine monitor receives from the guest operating system, through the virtual baseboard management controller, data including:
   data that describes the number, types, and resource usage of currently executing processes;
   data that describes current memory usage; and
   additional data that describes a current configuration and an operational status of the guest operating system.

13. The method of claim 8 wherein the virtual baseboard management controller provides a file-transfer utility.

14. The method of claim 13 wherein the virtual-baseboard-management-controller-provided file-transfer utility uses a virtual-machine-monitor facility for transferring data to virtual-data-storage devices.

15. The method of claim 8 wherein the virtual baseboard management controller includes functionality that allows an owner of a virtual machine, executing within a commercial system that hosts the virtual machine, to authorize one or more administrators of the commercial system to provide or to be provided user accounts with specified associated permissions and policies in order to restrict and constrain the types of virtual-baseboard-management-controller facilities that the one or more administrators can access.

16. Computer instructions stored on one or more physical data-storage devices that, when executed by one or more processors on one or more computer systems, control the one or more computer systems to:
   provide, by a virtual machine monitor, a virtual baseboard management controller within a virtual hardware interface implemented as computer instructions stored in one or more physical data-storage devices and executed on one or more physical processors of a physical computer system;
   recognize, by a guest operating system, information describing the virtual baseboard management controller during guest-operating-system booting;
   provide, by the guest operating system, a console interface through the virtual baseboard management controller; and
   input, by a virtual machine monitor, one or more of data and commands to the guest-operating-system-provided console interface through the virtual baseboard management controller.

17. The computer instructions stored on one or more physical data-storage devices of claim 16 wherein the virtual machine monitor issues, through the virtual baseboard management controller, commands that direct the guest operating system to carry out one or more of:
   altering the priorities of executing processes;
   launching processes;
   halting processes;
   shutting down the operating system;
   restarting the operating system;
   configuring resources;
   configuring hardware/software components;
   starting up and powering down various virtual hardware devices;
   adding hardware and software components; and
   removing hardware and software components.

18. The computer instructions stored on one or more physical data-storage devices of claim 16 wherein the virtual machine monitor inputs, through the virtual baseboard management controller, data including files and other data for storage in one or more virtual data-storage devices.

19. The computer instructions stored on one or more physical data-storage devices of claim 16 wherein the virtual machine monitor receives from the guest operating system, through the virtual baseboard management controller, data including:
   data that describes the number, types, and resource usage of currently executing processes;
   data that describes current memory usage; and
   additional data that describes a current configuration and an operational status of the guest operating system.

20. The computer instructions stored on one or more physical data-storage devices of claim 16 wherein the virtual baseboard management controller provides a file-transfer utility.

\* \* \* \* \*